United States Patent [19]
Brickell et al.

[11] Patent Number: 5,867,578
[45] Date of Patent: Feb. 2, 1999

[54] ADAPTIVE MULTI-STEP DIGITAL SIGNATURE SYSTEM AND METHOD OF OPERATION THEREOF

[75] Inventors: Ernest F. Brickell, Albuquerque, N. Mex.; Frank W. Sudia, Newton Centre, Mass.; David William Kravitz, Albuquerque, N. Mex.; Peter C. Freund; Patrick J. Angeles, both of New York, N.Y.

[73] Assignee: CertCo LLC, New York, N.Y.

[21] Appl. No.: 699,579

[22] Filed: Aug. 19, 1996

Related U.S. Application Data

[63] Continuation-in-part of Ser. No. 462,430, Jun. 5, 1995, abandoned.

[51] Int. Cl.$^6$ .................................................... H04L 9/32
[52] U.S. Cl. .............................................. 380/23; 380/30
[58] Field of Search ........................................ 380/30, 23

[56] References Cited

U.S. PATENT DOCUMENTS

| | | |
|---|---|---|
| 5,005,200 | 4/1991 | Fischer . |
| 5,164,988 | 11/1992 | Matyas et al. . |
| 5,224,163 | 6/1993 | Gasser et al. . |
| 5,276,737 | 1/1994 | Micali . |
| 5,315,658 | 5/1994 | Micali . |
| 5,481,613 | 1/1996 | Ford et al. . |

OTHER PUBLICATIONS

Yvo G. Desmedt, "Threshold Cryptography", Jul./Aug. 1994.

Ham, "Group–oriented (t,n) threshold digital signature scheme and digital multisignature", IEE Proc. Comput. Digit. Tech. vol. 141, No. 5, Sep. 1994, pp. 307–313.

Colin Boyd, "Some Applications of Multiple Key Ciphers" (undated).

"Threshold Hashing and Signing", Extended Abstract, (undated).

Y. Frankel, "A practical protocol for large group oriented networks", Advances in Cryptology, Proc. of Eurocrypt '89 (Lecture Notes in Computer Science 434)(1990), J.J. Quisgater and J. Vandewalle, Es. Springer–Verlag pp. 56–61.

A. Shamir, "How to share a secret", Commun. ACM 22 (1979) 612–613.

A. De Santis et al, "How to share a function securely".

Y. Desmedt, "Threshold Cryptosystems".

R.A. Croft et al, "Public–Key Cryptography and Re–Usable Shared Secrets", Cryptography and coding, 1986, pp. 189–201.

C. Boyd, "Digital Multisignatures", Cryptography and coding, 1986, pp. 241–246.

B. Blakley et al, "Threshold Schemes with Disenrollment", 1994.

Desmedt et al, "Shared Generation of Authenticators and Signatures", Lecture Notes in Computer Science 576, Advances in Cryptology—Crypto '91, 1991, pp. 457–469.

Li et al, "Remark on the Threshold RSA Signature Scheme", Lecture Notes in Computer Science 773, Advances in Cryptology –Crypto '93, 13th Annual International Cryptology Conference, Santa Barbara, California, Aug. 1993, pp. 4313–4419.

(List continued on next page.)

*Primary Examiner*—Gilberto Barrón, Jr.
*Attorney, Agent, or Firm*—Steptoe & Johnson LLP

[57] ABSTRACT

A multi-step digital signature system and method is provided having a distributed root certifying authority 20. Messages received at the root certifying authority 20 are distributed to root certifying authority members 22–30 who attach partial signatures to the message using root key fragments. In the system and method provided, the system adapts to system events such as the addition or removal of key fragment holders, the need to modify key fragments, etc., by changing key fragments.

17 Claims, 2 Drawing Sheets

OTHER PUBLICATIONS

Pedersen, "A Threshold Cryptosystem Without a Trusted Party", Lecture Notes in Computer Science 547, Advances in Cryptology –Eurocrypt '91, Workshop on the Theory and Application of Cryptographic Techniques, Brighton, UK, Apr. 1991, pp. 522–526.

Chang et al, "A New Generalized Group–Oriented Cryptoscheme Without Trusted Centers", IEEE Journal on Selected Areas of Communications, Jun. 1993, pp. 725–729, vol. 11, No. 5.

Frankel et al, "Non–existence of Homomorphic General Sharing Schemes for Some Key Spaces", pp. 549–557.

Pedersen, "Distributed Provers with Applications to Undeniable Signatures", Aarhus University, Computer Science Department, Ny Munkegade, Arhus, Denmark, pp. 221–242.

Reiter et al, "How to Securely Replicate Services", ACM Transactions on Programming Languages and Systems, vol. 16, No. 3, May 1991, pp. 987–1009.

Desmedt et al, "Homomorphic Zero–Knowledge Threshold Schemes Over Any Finite Abelian Group", SIAM J. Disc Math, vol. 7, No. 4, pp. 667–679, Nov. 1994.

5,867,578

ADAPTIVE MULTI-STEP DIGITAL SIGNATURE SYSTEM AND METHOD OF OPERATION THEREOF

This application is a continuation-in-part of U.S. patent application Ser. No. 08/462,430, filed Jun. 5, 1995, abandoned, the disclosure of which is incorporated herein by reference.

FIELD OF THE INVENTION

The present invention relates to multi-step digital signature systems. More particularly, the present invention relates to the management of the cryptographic keys used by certification authorities in multi-step digital signature systems.

BACKGROUND OF THE INVENTION

Historically, written documents have been used by parties to record for future reference, or to conduct, commercial transactions when the parties are either unable, or find it undesirable, to meet face to face. Written contracts and other commercial papers continue to account for the bulk of all commercial transactions. As a result, procedures have been developed and currently exist for verifying the identity of the parties who have engaged in a written commercial transaction. The most fundamental of these procedures is the requirement that each ascribing party obtain a notary stamp verifying their individual handwritten signatures. By requiring that this procedure be used, each party to the transaction can be assured of having a signature of the other contracting party which, if the need arises, can be independently verified by handwriting analysis. Further, each party has the added security of the notary who attested to the signing of the document and who can be called upon to verify the identity of a signatory to the document.

As the availability of electronic communication technology continues to grow, companies, such as large financial institutions, have shown great interest in applying such technologies to their day-to-day commercial transactions. The use of such electronic communication technology advances in modern commercial transactions has been hampered, however, by the relative ease within which electronic messages can be altered or forged and the difficulty encountered in verifying the integrity of both the received information and the identity of the party sending the transmission. Without a means for verifying both the integrity and the author of an electronic transmission, such transmissions would be unusable in a commercial setting. As a result, systems have been proposed to prevent the alteration and forging of electronic communications and to enable the verification of the identity of the transmitting party. One class of these systems relies on asymmetric-key cryptography wherein each member of the system creates a private signature key, which is maintained in strict secrecy, and a corresponding verification key which is publicly disseminated. When a first party, called the signer, wishes to sign a message, the signature is created using the message and the signer's own private signature key. A second party, called the verifier, can then verify the signature by performing a computation using the signer's public verification key, the message, and the signature. The properties of these computations assure the verifier that the document has been unchanged since it was signed. One such asymmetric-key cryptographic system is described in U.S. Pat. No. 4,405,829.

One problem encountered in asymmetric-key cryptographic systems is the need for a verifier to be assured that a public verification key belongs to a particular signer. Without such assurance, a verifier will have no way of discerning whether a message has in fact been sent by an intended signer or has been "forged" by a third party claiming to be that signer. This identification problem has been ameliorated in some systems through the use of a certification authority (CA) The CA produces a "root" verification key that is made widely available in a manner in which users can be assured that they have a correct copy of the root verification key. Then a signer can have their verification key "certified" (i.e., signed) by the CA, specifically by the CA root signature key. After verifying the signature on the document, a verifier can also verify the signature on the signer's verification key and is thereby assured of the identity of the signer.

The strength of the foregoing cryptographic system typically resides in the computational infusibility of deriving a signature key from knowledge of either the verification key or signed messages. Thus, so long as the signature key is kept secret, the signers have some assurance that documents cannot be forged in their name, and the verifiers have some assurance that documents bearing the electronic signature of the signer were in fact generated by the signer.

It is critical in these systems, however, that the respective signature keys of the signer and CA continue to be maintained in strict secrecy. Any compromise of the secrecy of these keys results in a breakdown of the integrity of the system. If a user's signature key is compromised, the CA must be notified to revoke the certificate and reissue a new one. If a CA's private signature key is compromised, all users who might rely on that key must be notified, all outstanding certificates must be revoked, the CA must generate a new asymmetric key pair, all users must be recertified, and the CA must broadly distribute its new public verification key. This is particularly a problem for the root verification key, because this key would likely be made available to, and potentially be relied upon by, millions of users. Such a loss can impose a great burden on the system. For such a key, a single fraudulent signature can cause substantial losses for a corporation.

In order to further ameliorate the problem of trying to protect a single private key, a system and method have been described for generating private key fragments for the root certification authority and then distributing these fragments amongst a number of members of a multi-step signing group. In accordance with this system and method, the private key for the root certification authority never exists in toto at any time. This system and method are disclosed in the co-pending U.S. patent application Ser. No. 08/462,430 (the '430 application), filed Jun. 5, 1995.

In the system and method of the '430 application, a private root signature key is fragmented and each of the fragments is distributed to a different member of a signature group. The message to be signed is distributed to each of the members of the signature group, either serially or in parallel, and the message is signed by each member using its fragment of the private root signature key. When a message has been signed by all members and thus, using all fragments, a final signature is formed which can be verified using a single public verification key. Further, because all fragments of the private root signature key are maintained in separate devices at separate locations at all times, security of the key is enhanced.

Each member of the multi-step signature group takes significant precautions to maintain the secrecy of the key fragment in their possession. This makes it physically infeasible to acquire all of the private key fragments and, because it is computationally infeasible to derive the signature key from the verification key or from a set of messages signed with the signature key, this system offers a greater barrier to would be adversaries.

The foregoing multi-step signature system and method represents a significant improvement over prior asymmetric-key cryptographic systems. A loss of one or more, but less than some specified amount k, of the key fragments will not compromise the integrity of a multi-step system. Improvements to the foregoing system are still desirable, however, for changing the key fragments in response to system events such as the actual or suspected compromise of a key, the addition or removal of key fragment holders, the need to modify the key fragments, a change in the number of fragment holders required to sign, or a loss of a key fragment. Using current, standard technology, such events will require generation of new CA keys, revocation and reissuance of all certificates, redistribution of the CA's new public verification key, a change of the private and public keys and notification to all potentially affected users. A need still exists, therefore, for a system and method for adapting to system events by changing key fragments without the need for changing the "root" verification key.

There are additional improvements that would be highly desirable for root CA multi-step signature systems or for any multi-step signature system in which the verification key must remain unchanged for an extended period of time. In particular, in an n-of-n multi-step root CA (where all n fragments of the root key are required to form a signature), it is desirable to securely backup the fragments in a safe and secure manner. Without a backup of the key fragments, the loss of a single fragment would make it impossible to sign anything new with that signature key.

Further, the system should allow for a change of the root keys on a routine basis. In particular, the system should allow for a change of key length so that security can be improved over time. Older devices may not be capable of handling the new key length however. A method to replace the root verification, key while causing as little disruption as possible, is therefore desirable.

SUMMARY OF THE INVENTION

The present invention responds to the needs of the foregoing multi-step digital signature systems. In its apparatus aspects a multi-step digital signature system is provided which includes a distributed certifying authority having a plurality of certifying authority members. Approval of a plurality of the plurality of certifying authority members is required in order to generate a digital signature for the distributed certifying authority. The distributed certifying authority may be one of a plurality of certifying authorities communicating to form a plurality of hierarchical certifying tiers.

In its process aspects, a method for decreasing the verification chain length in a hierarchical digital signature system is provided wherein a signature certificate for a user is obtained from a certifying authority at a first tier of the hierarchical digital signature system. The signature certificate from the first tier certifying authority is then presented to a higher tier certifying authority which issues a certificate authenticating the signature of the first tier certifying authority. The user then presents a verifier with the authenticating certificate of the higher tier certifying authority.

In its process aspects, a method is also provided for generating a digital signature in a n-of-n multi-step digital signature system having n certifying authority members in a distributed certifying authority wherein a message (m), to be signed, is received at the distributed certifying authority. The message is distributed to each of the n certifying authority members who then prepare separate messages (HASHr). The messages HASHr are prepared by selecting a random number (k) from which a value (r) is calculated using the function $$r = g^{kD(m,\ HASH)} \bmod p.$$

The HASH of the value r (HASH r) is then calculated. The HASHr value calculated by each of the certifying authority members are then distributed to the other n−1 certifying authority members. The r value is then distributed by each certifying authority member to the other n−1 certifying authority members and the r values are confirmed using the function SHA(r)=HASHr. A composite r value is then computed at each of the certifying authority members as the product of all of the r values and a signature fragment value is computed by each certifying authority member using the composite r value.

In its process aspects a method of identifying the k members that participated in generating a signature in a k-of-n multi-step digital signature system is also provided wherein a set of n bits are appended to the end of a message to be signed. Each of the n bits, which are associated with one of the n members of the k-of-n multi-step digital signature system, are used to indicate which k members participated in generating a signature.

It is an object of the present invention to provide a multi-step digital signature system.

It is a further object of the present invention to provide a method for protecting the private key of a root certification authority.

It is a further object of the present invention to provide a multi-step digital signature system capable of changing the number of key fragment members.

It is a further object of the present invention to provide a k-of-n multi-step digital signature system capable of modifying the value of k without the need for changing the public key.

It is a further object of the present invention to provide a k-of-n multi-step digital signature system in which it can be determined which k members signed a particular document.

It is a further object of the present invention to provide a multi-step digital signature system capable of recovering from a loss of a key fragment without the need for changing the public key.

It is a further object of the present invention to provide a method for decreasing the length of a verification chain.

It is a further object of the present invention to provide a method of changing the fragments of the private key without the need for changing the public key.

It is a further object of the present invention to provide a method for backing up the fragments in a multi-step digital signature system.

It is a further object of the present invention to provide a method for changing the root certification authority public key.

With these and other objects, advantages and features of the invention that may become hereinafter apparent, the nature of the invention may be more clearly understood by reference to the following detailed description of the invention, the appended claims, and to the several drawings attached herein.

DETAILED DESCRIPTION OF PREFERRED EMBODIMENTS

System Overview

Figure 1:
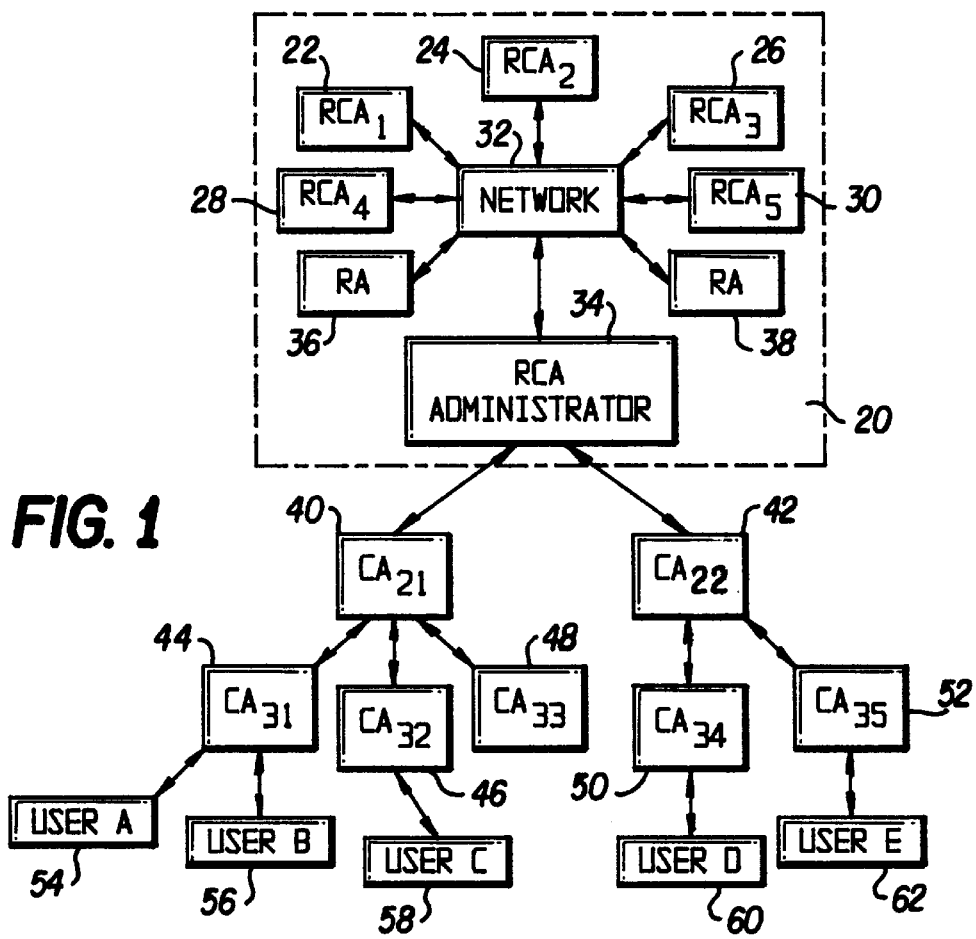
FIG. 1 is block diagram illustration of a cryptographic system incorporating a multi-step key fragment group in accordance with a preferred embodiment of the present invention.

Preferred embodiments of the invention will now be described with reference to the attached figures wherein like reference numerals indicate like elements.

In FIG. 1 there is shown an exemplary four-tiered hierarchical certification system, incorporating a multi-step digital signature system and method of the present invention. The system of FIG. 1 may, by way of example, represent a global financial network wherein the first or "root" tier may represent an international assemblage of banks (possibly including government institutions such as central banks of sovereign nations). The second tier may include individual banking companies, the third tier may include organizational customers of a banking company. The lower tier may be employees of corporations or bank customers.

The following description will adopt a nomenclature to describe a single root certifying authority that comprises a plurality of distributed entities. The root certification authority—as a single, composite entity—will be referred to as the "root certification authority" or "RCA." Individual members of the root certification authority will be referred to as "RCA members." The term "user" refers primarily to lower-tier system members that do not perform certification functions of the RCA (although they may act as intermediate tier certifying authorities to lower tier members), but also includes higher-tier members when they act individually and take advantage of verification capability for their own electronic transmissions.

In the system of FIG. 1, the highest authority, i.e., the root certifying authority 20, includes a set of RCA members (RCAI, where i=1, . . . , 5) 22–30 communicating through a Network 32. In addition to the RCA members 22–30, an RCA Administrator 34 and two registration administrators "RAs" 36, 38 are also depicted in communication through the Network 32. The RCA administrator 34 is responsible for communicating with the lower tier CAs and processing requests for certificates for submission to the RCA members 22–30. The RAs 36,38 are responsible for physically verifying the identify of a person or institution that is applying for a certificate.

When the RCA administrator 34 receives a certificate request, the request may be assigned to one or more RAs 36, 38 to verify the information in the certificate request before sending the request to the individual RCA members 22–30. Also, an individual RCA member may request additional verification from the RAs. The same or additional RAs may also be used by lower tier CAs to verify the identities of parties submitting certificate requests.

The RCA 20 issues certificates for second tier certifying entities of the certification system which is comprised of the individual certifying entities $CA_{21}$ 40 and $CA_{22}$ 42. The third tier of the certification system of FIG. 1 is comprised of certifying entities $CA_{31}$ 44, $CA_{32}$ 46 and $CA_{33}$ 48 which have been issued certificates by the second tier certifying entity $CA_{21}$ 40 and third tier certifying entities $CA_{34}$ 50 and $CA_{35}$ 52 which have been issued certificates by the second tier certifying entity $CA_{22}$ 42. The fourth tier of the certification system of FIG. 1 is comprised of USERS A–E 54–62 which have been issued certificates by the various third tier CAs 44–52.

The organization of system members in FIG. 1 is merely exemplary and may be modified in a variety of ways without departing from the spirit of the invention. For example, FIG. 1 depicts the RCA 20 as consisting of five RCA members 22–30, however, the RCA 20 may consist of any number of members greater than one. A system in accordance with the present invention may also include any number of tiers of certifying authorities, and users may seek certification at any tier. It should also be understood that FIG. 1 illustrates a baseline certification hierarchy, and that members of the system may issue certificates to any other member of the system (on the same or different tiers). While only the RCA 20 is shown as a distributed organization (and the description below will focus on its distributed operation), other certifying authorities at lower tiers may adopt the distributed operation described here for the RCA 20.

The system provides a certification function which enables users to verify the identities of other users who sign and send electronic transmissions. In routine operation, a user will prove his identity and give his public verification key to one of the RAs 36, 38. The RA will send this identifying information, the users verification key, and a statement of the authenticity of the information to a certifying authority. The certifying authority will certify this user's (signer's) verification key (also called a "public" key) by, e.g., signing an electronic document containing the signer's verification key, identifying information about the signer, and possibly other information.

The signer may then sign electronic messages using a cryptographic signature algorithm and the corresponding signature key (also called a "private" key) of a signature/verification key pair as discussed more fully below. A second user (verifier) will use the signer's certified public key to verify that the signer's signature is authentic. The verifier may acquire the signer's public key certificate directly from the signer or indirectly from, e.g., a public registry. The verifier may also check a certificate revocation list to see that the certificate of the signer has not been revoked.

An example of a verification process will now be provided with reference to FIG. 1. In this example USER A 54 composes a message (m), signs the message using its private signature key ($S_A$), and sends the signed message to USER B 56 along with a certificate obtained from a third-tier certifying authority $CA_{31}$ 44 for USER A's public verification key ($V_A$). When USER B receives the message, USER B verifies USER A's signature using the verification key included within USER A's certificate.

It should be understood that USER A's certificate is signed by $CA_{31}$ 44, and USER B may also have obtained $CA_{31}$'s verification key to verify the authenticity of $CA_{31}$'s signature on USER A's certificate. The certificate for $CA_{31}$ would have been issued from a higher-tier authority, e.g., $CA_{21}$ 40. A certificate for $CA_{21}$, in turn, would have been certified by the RCA 20, which in FIG. 1 is comprised of the individual RCA members $RCA_1$ through $RCA_5$ 22–30 as discussed more fully below.

In practice it is contemplated that users will also encrypt messages using a symmetric key encryption system. The sender, u, will encrypt a message using a public encryption key ($E_u$) of the intended recipient, and the recipient will decrypt the message using its corresponding private decryption key ($D_u$). Analogous to operation of signature/verification keys, messages encrypted using a public encryption key ($E_u$) can only be decrypted with a corresponding private decryption key ($D_u$).

As will become readily apparent to one skilled in the art, the foregoing RCA 20 can be used to certify encryption keys in the same manner as is described herein for certifying verification keys. Each user holds its signature key ($S_u$) and decryption key ($D_u$) in secret, while allowing distribution and certification of the corresponding verification key ($V_u$) and encryption key ($E_u$). It will be appreciated that the security and assurance provided by the user's signature and/or encryption relies in part on the security provided by the signatures of the hierarchy of certifying authorities. Security of signatures relies, in turn, primarily on the cryptographic strength of the signature scheme and on the safety of the private signature keys. It will therefore be appreciated that a compromise of the RCA signature key (also called the "root" key) would destroy the security of the entire system. The root key thus becomes a high-value target for attack by criminals, foreign agents, and hackers.

The system and method of the present invention provides added security for the root key through the RCA's distributed signing mechanism. The root key never exists in a single location in whole form, but is fragmented into shares. When signing a message, each RCA member separately applies its key fragment to the message in a distributed manner without recombining the shares to form a whole key. Further discussion of this key distribution mechanism is provided in the co-pending '430 application.

An attacker who wants to forge the root signature by obtaining the root key through physical means must penetrate the security of multiple RCA members. If an attacker succeeds in obtaining only a limited number of key shares, the attacker will not be able to reconstruct the root key. Although the system could continue to operate securely, steps would be taken, in accordance with the system and method of the present invention, to respond to the loss or compromise of one or more fragments.

RCA Member Overview

Figure 2:
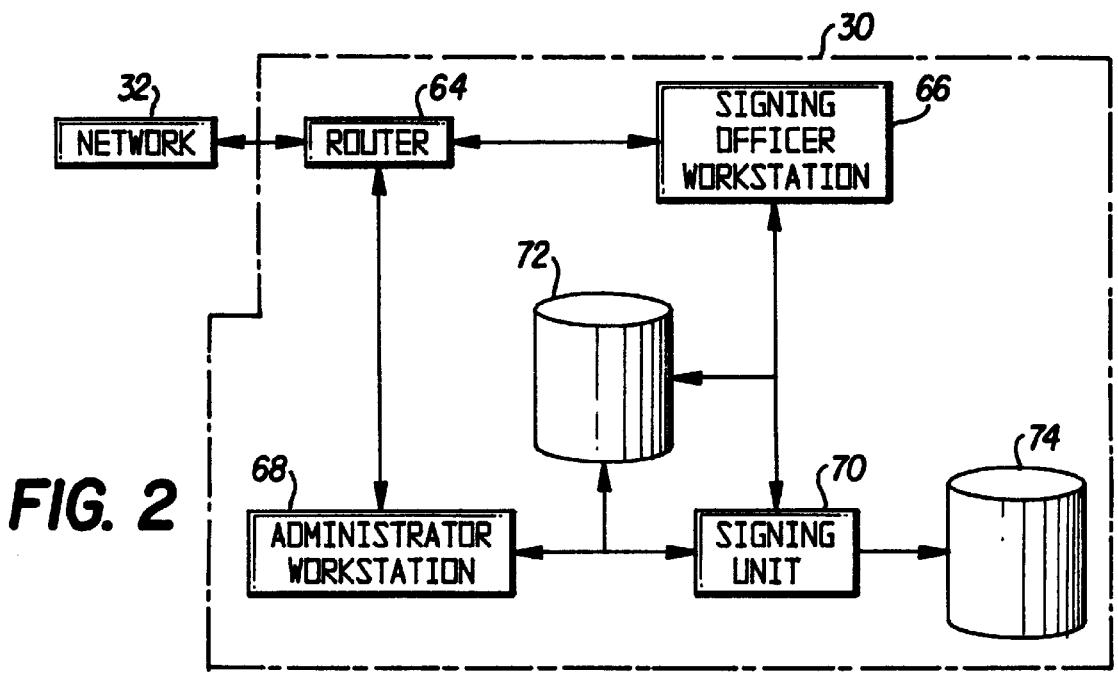
FIG. 2 is a block diagram illustration of an RCA member of the cryptographic system of FIG. 1.

An individual RCA member, e.g., $RCA_5$ 30 is depicted in FIG. 2, $RCA_5$ 30 consists of a router 64 for transmitting and receiving information, e.g., messages to be signed, from the network 32. The router 64 distributes the information to a signing officer workstation 66, if it is a message to be signed, or to an administrator workstation 68, if it is a message relating to system administration. Each of the signing officer workstation 66 and the administrator workstation 68 are in communication with a signing unit 70 and direct the signing unit to perform different tasks, e.g., signing messages or changing the lists of approved signing officers. Further descriptions of the signing officer workstation 66 and administrator workstation 68 are provided below.

A memory storage device 72 is provided in $RCA_5$ 30 to record all transactions between the signing officer workstation 66 or administrator workstation 68 and the signing unit 70. A second memory storage device 74 is provided for keeping a record of all messages signed by $RCA_5$ 30. In the event it becomes necessary to determine which RCA members or signing officers participated in signing a message, or which administrators participated in a certain act, this can be determined by auditing the records stored in the memory storage devices 72, 74. The logs of communications with the signing unit will ordinarily be available to auditors and thus, the private keys should not be determinable from the stored communications. Each of $RCA_1$ through $RCA_4$ 22–28, FIG. 1, are configured in the same manner as is described above for $RCA_5$ 30.

Figure 3:
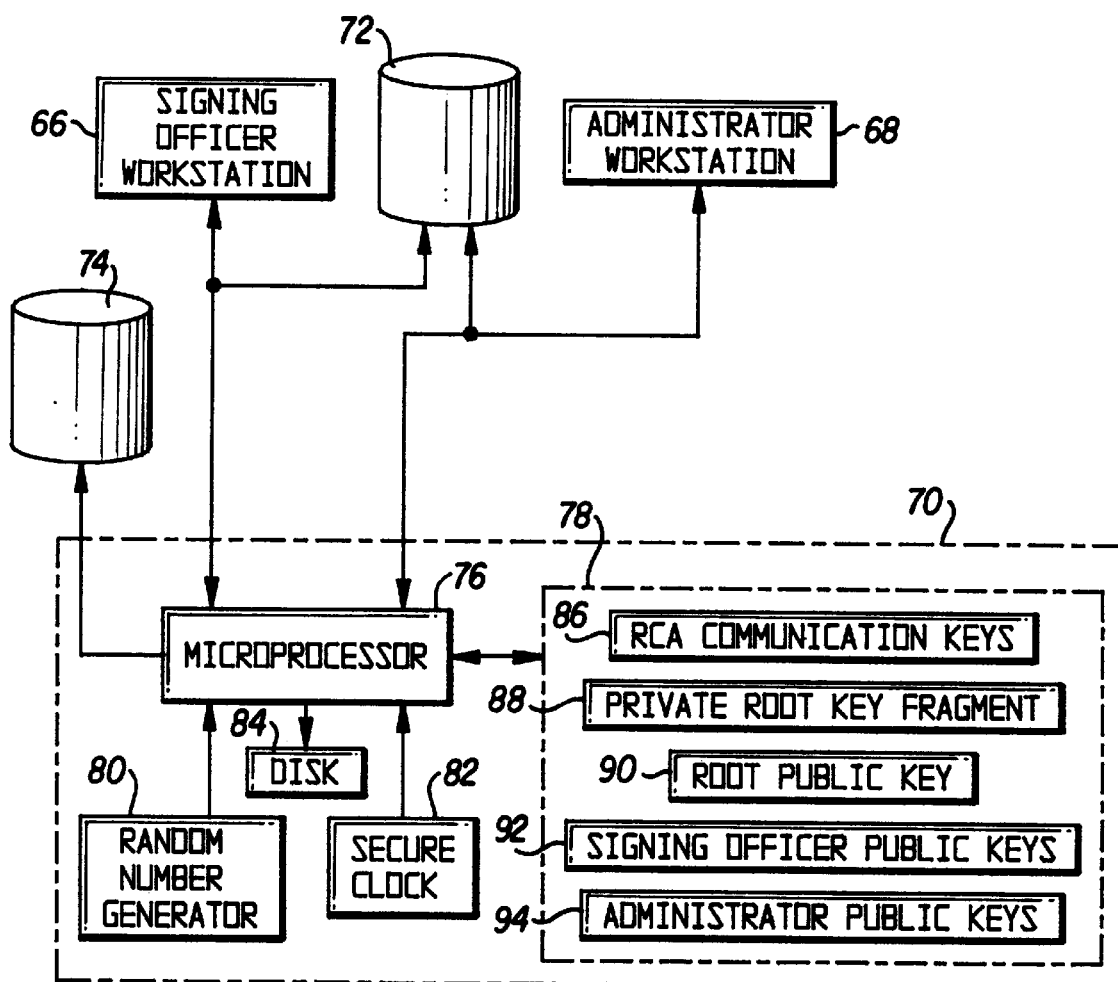
FIG. 3 is a block diagram illustration of the signing unit of the RCA member of FIG. 2.

In the preferred embodiment, the signing unit 70 of FIG. 2 is a trusted device. This trusted device is depicted in FIG. 3 and includes a microprocessor 76, a secure memory 78, a secure random number generator 80, a secure clock 82 and a memory storage disk 84. The trusted device is a tamper resistant device wherein it is extremely difficult for an adversary (or employee of the RCA) to alter the internal workings or to read or modify any storage within the device.

By way of example, the trusted device may be provided as a computer chip constructed in accordance with known methods for making it tamper resistant. The trusted device may also be provided as a computer in a physically secure facility wherein no direct access to the computer is permitted. In this embodiment, the computer would be addressed only through communication lines that are constantly logged and audited. It should be recognized that the foregoing embodiments of the trusted device are exemplary and should not be considered as limiting.

In routine operation, the signing units of each of the RCA members 22–30, FIG. 1, store a private signature key ($S_{RcAi}$), a public verification key ($V_{RcAi}$), a private decryption key ($D_{RCAi}$) and a public encryption key ($E_{RCAi}$) where $RCA_i$ represents the individual RCA member for i =1, . . . , 5. Each of the RCA members (in this instance and in future descriptions, the term RCA member may refer to the signing unit of the RCA member) will also maintain a list of the other RCA members and will store the public verification and public encryption keys for each of the other RCA members in order to conduct private and verifiably authentic communications among RCA members. In the signing unit 70 of the $RCA_5$ 30, depicted in FIG. 3, each of the foregoing public and private keys is stored in the memory space provided for RCA communication keys 86 in memory 78.

In the preferred embodiment, the encryption algorithms used for these communications (and other instances in this application where generic asymmetric-key algorithms are suggested) can be any secure algorithm preferably an asymmetric-key algorithm. It will be readily apparent to one skilled in the art, however, that in some instances, it may be more efficient and just as secure to use something other than an asymmetric-key algorithm. Particularly, following standard practices, an asymmetric-key algorithm, or a public key exchange algorithm, could be used just to exchange keys for a single key algorithm that is then used to encrypt or authenticate a session. Also, if performance becomes an issue, then keys for single key algorithms could be stored and used for multiple sessions. Because these procedures are well understood, they will not be discussed in this disclosure, but it will be understood that the present invention would include any of these possibilities.

Each RCA member, $RCA_i$, will also store a private fragment ($F_i$) 88 of a root signature key and the public root verification key $V_{RCA}$ 90. In the preferred embodiment, the private signature fragment, $F_i$, is not stored in plain text but rather it is stored encrypted. A method for the encryption and decryption of this signature fragment will be described below.

Also stored in the signing unit memory are the individual signing officer's public keys 92 and individual administrator's public keys 94. As will be discussed in a later section, the corresponding individual signing officer's and individual administrator's private keys are preferably held by these individuals on PC cards. The signing officer and administrator public verification keys are used by the signing unit to verify actions taken by individual signing officers and administrators and by auditors to audit the actions taken by individual signing officers and administrators. The signing officer and administrator public decryption keys are used to decrypt pieces of encrypted commands sent by the signing unit.

Protocols for creating and distributing fragments of the root key, recovering from loss of fragments, and other aspects of the system will be better appreciated and understood after first describing routine signing operations. Typically, users will generate signatures using a single key, however, multi-step signing will be compatible, i.e., the verification process for a signature generated using a whole key is the same for a signature generated in a distributed manner using key fragments in a multi-step procedure.

Variants of the ElGamal Digital Signature Algorithm

The preferred digital signature algorithm used in this invention is a variant of the ElGamal digital signature algorithm (VEDSA). The algorithm for a single signer is described in this section. In a first step a random large prime number p is selected such that p satisfies the formula p−=2qw, where q is a large prime number (for example, p might be two thousand and forty eight bits and q might be one hundred and sixty bits), and w is some integer. A base value g is selected such that g has the order q in the finite field GF(p). In an alternate embodiment, the value of q could be p−1, and g would be chosen to be an element of order p−1. The parameters, p, q, and g, should be generated in such a way as to allow mutually distrustful entities to check that the system parameters were not generated in a way which would allow any advantage, with respect to cryptanalysis, to the party who generated the parameters over the other users of those parameters. One means for achieving this result is to use the method set forth in the Digital Signature Standard FIPS document (National Institute of Standards and Technology (NIST). Publication XX: *Announcement and Specifications for a Digital Signature Standard* (DSS), August 1992.

Two integers a and b and functions D and E are next selected such that E is dependent on r (to be defined later) and at least one of D and E is dependent on the message m. The values p, q, g, a and b, and the functions D and E are then stored and concurrently made publicly available to each of the users in the system. During signing operations by an individual user, the user first randomly chooses a private signature key (x) between 1 and q−1 which will serve as their private key. The user then calculates a corresponding public verification key using the formula $y=g^x$ mod p. The user may have the public verification key certified at this time. The user will change his signature/verification key pair relatively infrequently.

For each message, m, to be signed, the signer computes HASH =SHA(m), where SHA is the Secure Hash Algorithm, and the signer chooses a random number (k) between 1 and q. The signer also calculates values for r and t using the formulas:

$r=g^{kD}(m, HASH) \bmod p;$ and $t=E(r, m, HASH).$

Using the value of t, the signer then derives a value for s by solving the formula:

$s=k-axt^b \bmod q.$

The signer next appends the signature (t, s) to the message.

In a particularly preferred embodiment of the signature protocol of the present invention, the variables a and b and the functions D, and E are taken to be:

a=1
b=1

D(m, HASH)=HASH

E(r, m, HASH)=SHA(r)

where SHA is the Secure Hash Algorithm. Another particularly preferred embodiment is for a, b, and D to be taken as above and for E to be taken as E(r, m, HASH)=r mod q. Not all choices of the functions D and E will necessarily be secure. For instance, it is desirable that HASH be used in the calculation of D or E. If HASH were not used, then it might be the case that messages that differed by a factor of q would have the same signature.

The protocol for verifying a signature generated by VEDSA will now be described. In the first step of the verification protocol, the verifier receives the message (m) and the attached signature (t, s). It is assumed that the signer also sends a certificate containing the signer's verification key and identification information. The verifier computes HASH=SHA(r) and then computes values u and v according to the formulas:

$u=sD(m, HASH) \bmod q;$ and $v=at^bD(m, HASH) \bmod q.$

The verifier then computes the value w according to the formula:

$w=g^u y^v \bmod p.$

The verifier completes the verification of the signature by calculating the function E(w, m, HASH) and verifying that the result equals t. The verifier may go through a similar verification process to check the signature of the signer's certificate.

It should be understood that all entities will use this verification protocol when verifying VEDSA signatures, whether those signatures are generated by the VEDSA for a single signer as presented above, or whether they are generated by the VEDSA multi-signature algorithm as presented below. Lower-tier entities will likely use a single device containing a whole signature key for signing using the method described above or using some other signature algorithm such as the well known DSA or RSA algorithms.

Multi-step signing

In one embodiment of the multi-step signature system of the present invention, a group of n RCA member devices holds a total of n root key fragments, and all n devices participate to form a single signature. This will be referred to as an "n of n" system. In the system depicted in FIG. 1, the first tier multi-step signing group has n equal to 5 root key fragments. In an alternate embodiment, for some fixed k<n, a subset of any k of the n RCA members (e.g., 3 of 5) can form a signature. This will be referred to as a "k-of-n" system.

One property of the multi-step systems that use the RSA algorithm such as described in the '430 application, is that the private signature group key must be in one piece when it is generated. This presents a "single point of failure" for the system, i.e., a point where the signature group key is susceptible to being copied or otherwise compromised. There are cryptographic techniques that can be used as a starting point to solve this problem. An example of such techniques can be found in L. Harn, *Group-oriented (t,n) threshold digital signature scheme and digital multisignature*, IEE proc. Comm. and Digital Tech., Vol 141, No. 5, Sep. 1994. In accordance with these techniques, signature key fragments can be generated by each member of the group and then the public verification key fragments can be combined into a public group verification key in such a way that the private group signature key is never created.

There is still a security problem in this cryptographic protocol however. A member of the group who waits until last before broadcasting a piece that will be used in forming the signature could "cheat" on the protocol and obtain a signature for a different document instead. The foregoing protocol could not be applied to develop a secure and robust root certification system, therefore, without a number of problems being solved. As described in the following section, the present invention provides a solution to these problem.

n Of n Multi-Step Signature Protocol.

A preferred embodiment of a protocol for an n-of-n multi-step signature process will now be described with reference to FIG. 1. This protocol prevents the above described security problem. It is assumed for this description that during system initialization, which will be described separately, RCA member, $RCA_i$, 22–30 will compute a private signature fragment, $x_i$.

In the first step of the signature process, the RCA administrator 34 of the RCA 20 receives a message m (which may be a certificate) for signature. The message m is then distributed to each of the n RCA members 22–30. Each RCA member 22–30 will have one or more signing officers who may need to look at the message and supporting documents before approving the signature. The message m could have the time of receipt at the RCA administrator 34 listed as part of the message, or the message could be a certificate with a validity period listed as part of the certificate. For these or for other reasons, the RCA member might need to check the secure clock in the signing unit to verify that the time listed on the message is consistent with the time of the clock.

Each RCA member, $RCA_i$, selects a random number, $k_i$, between 1 and q−1. (A new set of $k_i$ will be selected for each message.) Each RCA member, $RCA_i$ also calculates a value $r_i$ from the function:

$$r_i = g^{k_i\ D(m,\ HASH)} \bmod p;$$

Each RCA member, $RCA_i$, then calculates a value $HASHr_i = SHA(r_i)$.

The calculated values of $HASHr_i$ are then distributed to all of the other RCA members. When RCA member $RCA_i$ receives $HASHr_j$ from all of the other RCA members, it then sends the calculated value $r_i$ to all of the other RCA members. Each RCA member checks that $HASHr_i = SHA(r_i)$ for all of the $r_i$'s that it received from all of the other RCA members.

This two-step communication process is used so that an RCA member cannot change the value of $r_i$ after seeing the values from the other RCA members. If an RCA member could change the value of $r_i$ then an RCA member, say $RCA_1$, could wait until all of the other members had sent their $r_i$'s and then select his $r_1$ based on the other members values. For some choices of the function E, particularly if E is a function in only the first variable, $RCA_1$ would be able to select $r_1$ so that a signature could be obtained on a document other than the one that the other members thought they were signing.

In an alternate embodiment to the two-step communication process, each RCA member, $RCA_i$, could prove knowledge of the discrete logarithm of $r_i$ at the same time that $RCA_i$ distributed the value of $r_i$. This would remove the need for the two-step communication process. One easy way to prove knowledge of the discrete logarithm would be for $RCA_i$ to sign m (or some other message) using the product $k_i\ D(m, HASH) \bmod q$ as the private signature key and $r_i$ as the public verification key in a VEDSA signature.

In an alternate embodiment to the two-step communication process, each RCA member, $RCA_i$, could provide evidence of knowledge of the discrete logarithm of $r_i$ at the same time that RCAI distributed the value of $r_i$. This would remove the need for the two-step communication process. One way to provide evidence of knowledge of the discrete logarithm would be for $RCA_i$ to sign m (or some other message) using the product $k_i\ D(m, HASH) \bmod q$ as the private signature key and $r_i$ as the public verification key in a VEDSA signature. Another way to provide evidence of knowledge of the discrete log is through a Diffie Hellman challenge response. Specifically, $RCA_i$ can provide along with $r_i$ a value $f((g^{l_j})^{k_i\ H(m)}) \bmod p)$ for a previously received value $(g^{l_j} \bmod p)$ that was received from $RCA_j$. for each of the other RCA members, for an appropriate known function f. Functions f that would be appropriate include the mod q function.

After each RCA member has received all the $r_i$ values from all of the other RCA members and has verified them by checking the HASH or by verifying a signature using $r_i$, then each RCA member can compute a composite value r as the product of all the $r_i$. This composite value r corresponds to the value r used in the routine signature algorithm described above and used generically by all users. Each key fragment member can also use the composite value r to calculate a value $t = E(r, m, HASH)$ as in the single signer VEDSA described above.

RCA member $RCA_i$ now has sufficient information to compute the value $s_i$ by solving the formula:

$$S_i = k_i - ax_it^b \bmod q;$$

where $k_i$ is the random number selected earlier by $RCA_i$; $X_i$ is a private key fragment; and t is a value computed according to the function E(r, m, HASH).

All of the key fragment members distribute their respective values $s_i$ to a common entity (which may be one of the key fragment members or may be the RCA administrator), and that common entity computes a composite value s=sum of all the $s_i$. The entity then attaches the signature (t, s) to the message.

In some RCA systems, it will be desirable to reduce the number of communication steps. The embodiment described above requires one or two communication steps per signature to communicate the $r_i$ values and then an additional communication step to communicate the $s_i$ values. In alternative embodiments, only one communication step per signature is required after some communication steps are performed in an initialization protocol. In one of these alternative embodiments, a single communication step could consist of sending the $s_i$ values for the message numbered MN, the $r_i$ values for the message numbered MN+1, and the $HASHr_i$ values for the message numbered MN+2. In another alternative embodiment, a single communication step could consist of sending the $s_i$ values for the message numbered MN, the $r_i$ values for the message numbered MN+1, and the signatures of message numbered MN+1 (or the signature of some other message) that can be verified with the $r_i$ values as the public keys. In another alternative embodiment, a single communication step could consist of sending the Diffie-Hellman challenges to each of the other RCA members for the message numbered MN+2, the $r_i$ values for the message numbered MN+1 and the Diffie Hellman responses for the message numbered MN+1.

Yet another embodiment that reduces the number of communication steps is for each RCA member, $RCA_i$, to compute the $r_i$ values for the next batch of certificates to be signed, and then to communicate these values to all of the other RCA members participating in the next batch of signatures in a two-step communication process by sending the hash of the concatenation of all the $r_i$ for the batch, and then after receiving a similar communication from all of the other RCA members, then sending all of the $r_i$ values. This two-step communication process for the batch could be replaced with a single step communication process by sending the $r_i$ values together with a convincing proof that the discrete logarithm of all of these $r_i$ values are known. This convincing proof could be given by signing messages with each $r_i$ as a verification key for one of the signatures, or by signing multiple messages where products of some of the $r_i$ are the verification keys. Similarly, the Diffie Hellman challenge response protocol can be batched as well.

After this batch communication, then only a single communication process will be necessary for each individual signature, namely to send the $s_i$ values. This batch communication is particularity attractive when the function D(m, HASH) is a constant, i.e., does not depend upon m or the HASH. For then the computation of the $r_i$ values could be preformed independently of the messages. However, the batch process can still be preformed if D(m, HASH) is not a constant by having each of the RCA members, $RCA_i$, compute a $PREr_i$ value where $PREr_i = g^{ki}$ mod p. The $PREr_i$ values would be distributed following the protocols described above for distributing the $r_i$ values. When an RCA member has received all of the $PREr_i$ values, for message numbered N, say, from all of the other RCA members and verified all of those values, PREr for message numbered N is computed as the product of all of the $PREr_i$'s. When $RCA_j$ received a message m which is numbered N, then $r = PREr^{D(m, HASH)}$ mod q is computed. This technique of computing PREr before receiving m could also be applied to the previous embodiment in which r was computed only a message or two in advance.

k-of-n Signing Protocol

One disadvantage of the n-of-n signing protocol is that all RCA members are needed for signing operations, and operations would cease if any one RCA member were taken out of service. As described above, an alternative to the n-of-n signing method is a k-of-n signing method in which a group of fewer than all of the RCA members can form a signature. Specifically, in a k-of-n system any subset of k RCA members can form a signature which can be verified using the public verification key. Although the k-of-n method is designed for use for k<n, it will function for k=n as well. Therefore, unless specifically noted, it will be assumed that in the description of the k-of-n systems that k could equal n. The k-of-n method functions within the overall certification hierarchy in much the same way as the n-of-n system except for the set up and operational differences discussed below.

In system initialization which will be described separately below, each RCA member will receive a private key fragment, $F_i$. After the private key fragments have been received, a message can be signed by any k-of-n RCA members using a modified form of the n-of-n protocol described above. In the k-of-n protocol, the k signing key fragment members must be identified prior to signing and they must perform an initial computation dependent on the selected subset of the k signing key fragment members. The RCA administrator will receive a message to be signed and will determine which k RCA members will participate in the signature, perhaps by determining which members are available and willing to sign.

In addition, in the preferred embodiment, the message to be signed will be modified so that the actual set of k signers is identified in the message. In the RCA 20, FIG.1, this is useful for auditing purposes so that if a certificate later is audited, it will be known which k signers were used. A way to do this is to append a set of n bits to the end of the message, with 1's placed in the bit positions corresponding to the k signers. (There will be a document that lists the RCA members and the ordering of the members.) A signing unit will use this set of n bits to determine the identity of the k signers. The computation that a signing unit performs is dependent upon the subset of k signers, as will be indicated later.

An untampered signing unit could be designed such that it cannot be forced to produce a partial signature on a message in which that RCA member, $RCA_i$, was not listed as one of the signers. An RCA member would have to break the tamper resistance of its signing unit and modify the device to compute a signature using his root key fragment on a message with the wrong k signers indicated. In fact, it would be necessary for k of the RCA members to modify their devices to successfully sign a message with the RCA root key for which those RCA members were not identified in the message. To further diminish the possibility of having the RCA members corrupted to sign messages when those RCA members were not identified in the message it is preferred that k be greater than one-half of n (k>n/2). Then, if a message were signed by RCA's not identified in the message, at least one of the corrupted k signers that signed the message would have been in the subset indicated by the message and can be later investigated. It is envisioned that in some applications of the k-of-n system, the option of identifying the k signers will not be used.

For a subset, T, of k RCA members, designated $RCA_{Bi}$ for i=1, ..., k, to sign a message, the selected subset of k signers must first each compute a private subset T fragment corresponding to that group. These subset T fragments, designated $x_{Bi}$, for i=1, ..., k are computed, using Lagrange interpolation, from the private key fragments $F_i$ for each of the k RCA members in subset T. The description of this computation of $x_{Bi}$ is given in Procedure 1 below. The private subset T fragments $x_{bi}$'s are then used as the private key fragments in a k-of-k multi-step signing protocol as described above. Specifically, the same protocol is used, but the notation is slightly different.

Each RCA member in subset T, $RCA_{Bi}$, selects a random number ($k_{Bi}$) between 1 and q, for i=1, ..., n,. (A new $k_{Bi}$ will be selected for each message.) Each RCA member in subset T, $RCA_{Bi}$ also calculates a value $r_{Bi}$ from the function:

$$r_{Bi} = g^{kBi\ D\ (m,\ HASH)} \bmod p;$$

Each RCA member in subset T, $RCA_{Bi}$, then calculates a value $HASHrBi = SHA(r_{Bi})$.

The calculated values of $HASHr_{Bi}$ are then distributed to all of the other RCA members in subset T. When RCA member in subset T $RCA_{Bi}$ receives $HASHr_{Bi}$ from all of the other RCA members in subset T, it then sends the calculated value $r_{Bi}$ to all of the other key fragment members in subset T. Each RCA member in subset T checks that $HASHr_{Bi} = SHA(r_{Bi})$ for all of the $r_{Bi}$'s that it received from all of the other members in subset T.

After each RCA member in subset T has received all the $r_{Bi}$ values from all of the other RCA members in subset T and has verified them by checking the HASH or by verifying a signature using $r_{Bi}$, then each RCA member in subset T can compute a composite value r as the product of all the $r_{Bi}$. This composite value r corresponds to the value r used in the routine signature algorithm described above and used generically by all users. Each key fragment member in subset T can also use the composite value r to calculate a value t=E(r, m, HASH) as in the single signer VEDSA described above. The various techniques described earlier for reducing the number of communication steps required to securely compute r can be applied if desired.

RCA member in subset T $RCA_{Bi}$ now has sufficient information to compute the value $s_{Bi}$ by solving the formula:

$$s_{Bi} = k_{Bi} - ax_{Bi} t^b \bmod q;$$

where $k_{Bi}$ is the random number selected earlier by $RCA_{Bi}$; $x_{Bi}$ is the private subset T key fragment; and t is a value computed according to the function E(r, m, HASH).

All of the RCA members in subset T distribute their respective values $s_{Bi}$ to a common entity (which may be one of the RCA members in subset T or may be the RCA administrator), and that common entity computes a composite value s=sum of all the $s_{Bi}$. The entity then attaches the signature (t, s) to the message.

Because different subsets of k RCA members will result in different calculation of the $x_{Bi}$'s, each subset of k RCA members will compute a different set of k $x_{Bi}$'s. For a given subset of k signers the computation need be done only once for all messages signed by this subset, so if the same subset of k signers will be used for signing several messages, they can store the $x_{Bi}$'s for some period.

The signature produced from any subset of k signers can be verified using the same public key, $V_{RCA}$. Thus, any subset of k key fragment members can sign a message, and the same publicly disseminated verification key can be used to verify that signature.

Procedure 1

The procedure for computing the private subset T fragments for use in a k-of-n multi-step signing system will now be described. In the description which follows, there will be a distinguished subset of k (of the n) RCA members that will be participating in this procedure. This distinguished subset will be referred to as subset T. To denote the members of T, first denote a set B={$B_1, B_2, \ldots, Bk$} of integers between 1 and n. Then $RCA_{Bi}$ will represent the ith RCA member of subset T.

As stated earlier, in a k-of-n system, $F_i$ represents the private key fragment for RCA member $RCA_i$. The $F_i$ have the property that there is some polynomial w of degree k−1 such that $w(i)=F_i \bmod q$ for i=1, . . . , n, and such that $w(0)=S_{RCA}$, i.e., the private root signature key that is never revealed or known to anyone. The k RCA members in subset T, $RCA_{B1}$, $RCAB_2$, . . . , $RCA_{Bk}$, can compute a set of integers $x_{B1}, \ldots x_{Bk}$ such that $x_{Bi}$ is known only to the signer $RCA_{Bi}$ and such that the sum of these integers is $S_{RCA}$, specifically, $x_{B1} + \ldots + x_{Bk} = S_{RCA} \bmod q$. A reader skilled in the art will recognize this procedure as a basic procedure used in secret sharing protocols.

To perform this procedure $RCA_{Bi}$ will compute $x_{Bi}$ as follows:

$$x_{B_i} = F_{B_i} \prod_{\substack{B_j \text{ in } B \\ j \neq i}} \frac{(-B_j)}{(B_i - B_j)} \bmod q$$

The foregoing procedure will be referred to as Procedure 1.

Procedure 2

In this procedure, k RCA members will use their private key fragments to distribute new private key fragments to a k' out of n' signature group, where k' may be different from k, and n' may be different from n.

In the description which follows, there will be a distinguished subset of k of the n RCA members that will be participating in this procedure. This distinguished subset will be referred to as subset T. To denote the members of T, first denote a set B={$B_1, B_2, \ldots, Bk$} of integers between 1 and n. Then $RCA_{Bi}$ will represent the ith RCA member of subset T. If the members, $RCA_{Bi}$, in the subset T do not already have values $x_{Bi}$ such that the sum of the $x_{Bi}$'s is $S_{RCA} \bmod q$, then procedure 1 will be used to calculate such values $x_{Bi}$.

Next, each $RCA_{Bi}$ (for 1←i←k) will pick a polynomial $w_i$ of degree k'−1 over the integers modulo q such that $w_i(0)= X_{Bi}$. specifically, pick integers $Ai_0, Ai_1, \ldots, Ai_{k'-1}$, such that $Ai_0 = x_{Bi}$ and for j between 1 and q−1, each $Ai_j$ is chosen randomly between 1 and q−1. Then $w_i(x) = Ai_0 + Ai_1 * x + Ai_2 * x^2 + \ldots + Ai_{k'-1} * x^{k'-1} \bmod q$. $RCA_{Bi}$ will send to $RCA_j$ the value $w_i(j)$ for i=1 to k, and j=1 to n. This communication must be encrypted using $E_{RCABJ}$ and signed using $S_{RCABi}$. For notational purposes, the sum of all k of the polynomials $w_i$ is NEWW mod q, but NEWW is never actually computed.

$RCA_j$ can form NEWw(j)=the sum of all k of the $w_i(j)$ mod q.

Let $NEWF_j$=NEWw(j), for 1←j←n'.

For RCA members who previously held a fragment, their old fragment, $F_i$ will be replaced by this new fragment, $NEWF_i$. Also NEWW will replace w as the polynomial that satisfies $w(i)=F_i$.

The foregoing procedure will be referred to hereafter as Procedure 2.

An RCA Member Signature Facility

As with any computing facility, it will be necessary to have human involvement in the administration and operation of the RCA member signature facility. To maintain high levels of security, most functions will have two components, administration and signing, and each component will require more than one person to perform an action. In other embodiments the functions of the administrators and the signing officers could be combined so that the signing officers would also perform all of the functions of the administrators.

The "signing officers" will be the only people allowed to authorize a signature fragment to be generated using the RCA member root key fragment. The "administrators" will be needed to authorize any other function performed by the signing unit that does not involve signing a certificate or document. The administrator functions include: adding or deleting authorized administrators or signing officers, changing the number of administrators needed for a quorum, authorizing modifications to the RCA membership.

For any function to be performed on the signing unit, it will take a quorum of kA of the administrators. The size of the quorum needed for different functions may vary depending on the function, but for clarity, the notation kA will always be used to denote the number of administrators needed for the function being discussed. The administrators operate the signing unit through one or more administrator workstations 68, FIG. 2, connected to the signing unit 70, with all communication between the workstations and the signing unit 70 being monitored and logged with a secure logging procedure.

To ensure that only valid administrators can send commands to the signing unit, each administrator is assigned a trusted token, such as a PC card. Ideally, the trusted token would have an input device for entering a personal identification number ("PIN") directly onto the token for activation. In another embodiment, the PIN could be entered into the token through the administrator workstation. More elaborate biometric methods may be used to link a human administrator to a trusted token.

The trusted token for signing unit administrator i ($SUA_i$) will contain two key cryptographic communication keys: an encryption/decryption key pair, $E_{SUAi}/D_{SUAi}$, and a signature/verification key pair, $S_{SUAi}/V_{SUAi}$. In addition, the signing unit (SU) will generate and store an asymmetric-key cryptographic signature/verification key pair, $S_{SU}/V_{SU}$. These keys, i.e., $S_{SU}/V_{SU}$, which will need to be replaced on a routine basis, will be stored on the disk 84 of the signing unit 70.

During a startup procedure, each of the administrators will input their verification and encryption keys into the signing unit. The verification keys will be used to authenticate the commands issued to the signing unit by the administrators. All communications between the signing unit and a signing unit administrator will be signed by either $S_{SU}$ or $S_{SUAi}$ for auditing purposes. The encryption keys will be used to encrypt portions of the commands to the signing unit that must be hidden from the auditors examining the logs of the traffic between the administrator workstations and the signing unit.

After a sufficient number of signing unit administrators have been set up, a quorum of kA administrators will instruct the signing unit to construct an encryption/decryption key pair, $E_{RCAi}/D_{RCAi}$, and a signature/verification key pair, $S_{RCAi}/V_{RCAi}$. These key pairs will be used in communications with other RCA members that involve the root key fragments. The private keys of these key pairs could be stored on the disk 84 of the signing unit 70. However, to provide additional security, the following protocol will be used to protect these keys from an adversary who might obtain access to the information on the disk 84 of the signing unit 70 and might monitor the communications between the signing unit 70 and the signing unit administrators.

The signing unit 70 and the administrators will set up a secret sharing scheme using a method such as that presented in. Shamir, "How to share a secret", Communications of the ACM, Vol. 22, pp. 612–613, Nov. 1979. Any kA administrators can direct the signing unit to compute a Communication Keys Encryption Key, CKEK. CKEK will be the encryption key for a single key algorithm, for example, triple DES. The signing unit will select the key, CKEK, randomly. The signing unit will contain a prime PRIME such that PRIME is larger than the $2^{128}$. The value $2^{128}$ is used because the CKEK will have at most 128 bits. If a different key size is chosen for CKEK, the size of PRIME can be modified appropriately. The signing unit will randomly select a polynomial $w_{CKEK}$ of degree kA–1, such that $w_{cKEK}(0)=CKEK$ mod PRIME, where CKEK is interpreted as the binary representation of an integer. Specifically, the signing unit will randomly select integers $A_1, \ldots, A_{kA-1}$, and will set $w_{CKEK}(x)=CKEK+A_1 x+A_2 x^2+\ldots+A_{kA-1}x^{kA-1}$ mod PRIME. For each SUA, the signing unit will send the value of $w_{CKEK}(i)$ mod PRIME to the token of $SUA_i$ encrypted with $E_{SUAi}$. The token of $SUA_i$ will decrypt this message, recover the value of $w_{CKEK}(i)$ and store it in the token.

The value of $w_{CKEK}(i)$ would probably be stored in encrypted form in the token following standard procedures of the token. Following a testing phase, CKEK will be used to encrypt the private values, $D_{RCAi}$ and $S_{RCAi}$, to form $CKEK(D_{RCAi})$ and $CKEK(S_{RCAi})$ which will then be stored on the disk of the signing unit. The plaintext copies of CKEK, $D_{RCAi}$, and $S_{RCAi}$ will then be erased from memory.

Whenever the signing unit needs to use the keys, $D_{RCAi}$ and/or $S_{RCAi}$, a quorum of kA signing unit administrators will issue a command to reconstruct the keys, $D_{RCAi}$ and/or $S_{RCAi}$. The signing unit will generate a temporary encryption/decryption key pair, $ET_{SU}/DT_{SU}$. For each of the kA signing unit administrators, $SUA_i$, the signing unit will send $ET_{SU}$ to $SUA_i$. $SUA_i$ will encrypt $w_{CKEK}(i)$ with $ET_{SU}$ and send it back to the SU. When the SU has received and decrypted the kA values $w_{cKEK}(i)$, then the SU can compute $w_{cKEK}(0)$ by calculating the following sum. To denote the kA administrators participating in this procedure, first denote a set $B=\{B_1, B_2, \ldots, B_{kA}\}$ of integers. Then $SUA_{Bi}$ will represent the ith SUA administrator participating in this procedure. Then $$w_{CKEK}(0) = \sum_{B_i \text{ in } B} w_{CKEK}(B_i) \prod_{\substack{B_j \text{ in } B \\ j \neq i}} \frac{(-B_j)}{(B_j - B_i)} \mod q$$

The signing unit sets CKEK to $w_{CKEK}(0)$ and uses CKEK to decrypt $CKEK(D_{RCAi})$ and/or $CKEK(S_{RCAi})$ to obtain $D_{RCAi}$ and/or $S_{RCAi}$. The signing unit then erases the values of CKEK, $DT_{SU}$, the $w_{CKEK}(i)$, and all temporary values used in the computation of $w_{CKEK}(0)$ from memory. After the signing unit has performed the protocol using $D_{RCAi}$ and/or $S_{RCAi}$, it will erase those keys from memory.

For additional security, some number of the signing unit administrators could be required to input their encrypted w(i) directly to the signing unit or through a physically secure network. This would help protect against an adversary who had determined the values of $S_{SU}$. It would also be a preferred policy to modify the value of $S_{SU}$ on a routine basis. To modify $S_{SU}$, the signing unit will generate a new signature/verification key pair, $NEWS_{SU}$ and $NEWV_{SU}$. The signing unit will sign $NEWV_{SU}$ using the old $S_{SU}$, which the signing unit will distribute along with $NEWV_{SU}$ to each of the signing unit administrators. In the preferred embodiment, all of the signing unit administrators would be connected to the signing unit over a physically secure network during this protocol. When all of the signing unit administrators have received $NEWV_{SU}$ and it has been properly tested then the new values will replace the old ones and the old ones will be destroyed.

Each signing officer ($SO_i$) will have a workstation and a trusted token, similar to the administrator token, which contains a signature/verification key pair, $S_{SOi}/V_{SOi}$, and an encryption/decryption key pair, $E_{SOi}/D_{SOi}$. The administrators will set the total number of signing officers to be some number NSO, and will set the size of the quorum, kSO, of the signing officers that will be required to approve any signing command. For each of the NSO signing officers, the administrators will issue an "add signing officer" command, and the verification and decryption keys of the signing officer will be placed in the signing unit. After the initial set of signing officers has been established, adding other signing officers or modifying the quorum of signing officers needed to authorize signing may require a quorum of signing officers and a quorum of administrators.

RCA Secure communications Set Up

The security of the RCA depends, in part, on securely establishing communications among the RCA members and on securely distributing signing key fragments. A protocol for establishing such secure communication among RCA members will now be described.

To establish secure communications among the RCA members, each RCA member distributes its public verification and encryption keys to all of the members of the multi-step signature system and receives the public verification keys of the other members. Because of security considerations, a preferred method for transferring these RCA member keys is a physical meeting of representatives of the key fragment members. By way of example (with reference to the RCA 20, FIG. 1), each of the RCA members 22–30 selects kA administrators to go to a meeting, each carrying PC-cards or other computer storage disks containing the public verification and encryption keys ($V_{RCAi}$ and $E_{RCAi}$) for that key fragment member. Each of the kA representatives from an RCA member will give one card to each representative from each of the other RCA members. Each representative will return to its respective RCA member secure computer facility with one card from each of the other RCA members. Each of the representatives will take a different return route to increase the difficulty for an attacker to substitute impostor cards for the genuine cards.

At the RCA member's facility, the information on each of the sets of kA cards will be entered into the signing unit. If there is any discrepancy at any of the RCA member locations, the distribution protocol will be performed again. If there are no discrepancies, a testing phase will begin in which the RCA members 22–30 send and receive encrypted and signed messages and confirm receipt by verifying and decrypting and by sending confirmation through some out of band communications channel, such as phone or overnight mail services. After the testing phase, these keys can be used to communicate authentically and securely among RCA members 22–30. In another embodiment all of the group of kA administrators from each RCA member would travel to each of the other RCA member locations for entering the communication keys directly into the signing units through the signing unit administrator's workstations.

Each RCA member will then use its own private signature key ($S_{RCAi}$) to sign all the other RCA member's public verification and encryption keys ($S_{RCAi}$). After this, each member distributes copies of the signed public verification and encryption keys to all other RCA members. Finally, the sets of received and signed keys are compared by each member to verify that all members received the same public verification and encryption keys for all of the other members.

Modification Of The Communication Keys

The foregoing private signature/public verification and private decryption/public encryption key pairs used for communications between the RCA members should have some period of expiration and replacement. At a predetermined expiration and replacement time, or on an emergency basis if one of the members thinks there has been a compromise, the RCA members construct new decryption/encryption and signature/verification key pairs. Here, the earlier-distributed signature keys are used to sign the new public encryption and verification keys, which are then sent to the other RCA members. Because this protocol is used to recover if there has been a compromise of the decryption or signature key of RCA members, special care should be taken to make sure that the party claiming to be an RCA member actually is the correct party. After RCA member, $RCA_i$, constructs new key pairs, the new public keys will be signed with the old signature key, and the new public keys and the signature will be sent to all of the other RCA members. Then each RCA member will be assured that the new keys were sent by a party that knew the previous private signature key. All of the RCA members go through these checks.

There is still, however, the possibility that the communication above was sent by an imposter that stole the previous signature key rather than the RCA member. To prevent an imposter from posing as an RCA member, each pair of RCA members can go through an off-line check to ensure the new keys really were generated by the correct party. For instance, RCA member, $RCA_i$ might send $RCA_j$ a message encrypted with the new encryption key of $RCA_j$, and then call $RCA_j$ on the phone to determine if the message was received. $RCA_i$ could also send RCA a letter asking if the message was received. This will only give "after the fact" detection of a compromise, but that knowledge could reduce losses.

After the RCA members have received the new keys and are convinced that they came from the correct RCA members, then the RCA members go through a testing phase with the new keys before the previous public keys are discarded. Alternatively, if a compromise of the keys is detected the process for creating the secure communication channel, then physical meetings, as described above to initially establish secure communications, can be repeated for the new keys.

Generation Of RCA Key Fragments

After distributing individual private signature keys and public verification keys to each of the RCA members 22–30 and thus establishing a secure communication channel, the key fragments for the RCA root signature key, $S_{RCA}$, can be established as described below.

The $S_{RCA}$ key generation process will be described for the k-of-n system, where k could be equal to n. First a subset of k RCA members will be chosen to be in the key generating group. Each of the RCA members in the key generating group, $RCA_{Bi}$, selects a random number ($x_{Bi}$) between 1 and q−1 which is taken to be the private root key fragment for that member. Each member of the key generating group, $RCA_{Bi}$, further calculates a public key fragment $FV_{Bi}$ using the equation:

$$FV_{Bi} = g^{x_{Bi}} \bmod p.$$

Each RCA member of the key generating group, $RCA_{Bi}$ then uses its individual signature key $SRCA_{Bi}$ to sign a message containing the computed $FV_{Bi}$, and each RCA member in the key generating group, $RCA_{Bi}$, distributes the signed $FV_{Bi}$ to the other RCA members in the key generating group. Each RCA member in the key generating subset $RCA_{Bj}$ then signs the received (and signed) $FV_{Bi}$'s using its own $F_j$ as the signature key. Thus, $FVB_j$ as the verification key for the signature and then redistributes the signed $FV_{Bi}$'s to all of the other RCA members in the key generating group. All of the RCA members in the key generating subset check that the signatures were correct, and compare the signed $FV_{Bi}$'s to ensure that each has received the same public key fragments from each of the other RCA members in the key generating group. If so, each RCA member in the key generating subset computes a value VRCA as the product of all of the $FV_{Bi}$'s.

In an alternate embodiment, the RCA members in the key generating subset could send out the HASH (using for instance SHA as the hash function, HASH) of their individual $FV_{Bi}$ values, then receive all of the HASH's from the other RCA members in the key generating subset before sending out their actual $FV_{Bi}$'s. This step could be instead of, or in addition to, sending out the signed $FV_{Bi}$'S. Each RCA member in the key generating group, $RCA_{Bi}$, signs its individually-computed VRCA (using its respective private signature key $V_{RCABi}$) and distributes the signed VRCA to the other RCA members in the key generating group. VRCA then becomes the root verification key for the RCA.

There is a mathematical value $S_{RCA}$ which, if formed, would be a private signature key corresponding to the verification key VRCA. This mathematical value is not actually formed. However, for ease of reference, it will be said that the RCA is using the private signature key $S_{RCA}$ when the RCA members use their respective fragments to form a signature that can be verified by public key $V_{RCA}$.

At this point, the k members in the key generating subset make up a k-of-k multi-step system (specifically, an n-of-n system with n=k). They have private key fragments, $x_{Bi}$ such that the sum of the $x_{Bi}$ is SRCA. If the system is to be a k-of-k system, then the $x_{Bi}$ will remain the private key fragments. However, if the system is to be a k-of-n system for n>k, then the k members in the key generating subset must distribute fragments to the other n-k members. They do this by using Procedure 2 described above. In performing Procedure 2, they don't need to preform Procedure 1, because they already have private key fragments, $x_{Bi}$ such that the sum of the $x_{Bi}$ is $S_{RCA}$. After performing the protocol described in Procedure 2, each of the n RCA members, $RCA_i$, will have a private key fragment $F_i$, and there will be a polynomial w of degree k-1 such that w(i)=$F_i$ mod q.

In the case of k=n, i.e., in the n-of-n system, an additional step is needed to provide for a recovery mechanism in the event that one of the fragments is lost. In addition to computing the value VRCA as the product of all of the $FV_i$'s, each of the RCA members will also compute a set of additional values $z_j$, where $z_j$ is the product of all FVi's except $FV_j$ for j=1, . . . , n. For the example of five RCA members 1, . . . , n:

$Z_1=FV_2 * FV_3 * FV_4 * FV_5$ mod p;

$Z_2=FV_1 * FV_3 * FV_4 * FV_5$ mod p;

$Z_3=FV_1 * FV_2 * FV_4 * FV_5$ mod p;

$Z_4=FV_1 * FV_2 * FV_3 * FV_5$ mod p;

$Z_5=FV_1 * FV_2 * FV_3 * FV_4$ mod p.

Each of the RCA members will sign the $z_j$'s with their private signature keys and distribute the signed keys to the other key fragment members. Each RCA member then verifies that it has computed the same set of $z_j$'s. If so, the RCA issues a certificate for each of the $z_j$'s, signed by the root signature key, $S_{RCA}$. In the event that one of the RCA member keys was lost, say $F_j$, then $z_j$ would be used as an alternate verification key for new certificates signed by the RCA. The remaining RCA members can continue to sign (using n-1 fragments), and the signatures can be verified by using $z_j$. In particular, the $z_j$; formed from the product of all the $FV_i$ except for $FV_j$, the lost fragment. Any certificate signed by the remaining subset of n-1 members can be verified by $z_j$, and because $Z_j$ has a certificate from the root public key $V_{RCA}$, $Z_j$ can be verified by $V_{RCA}$. Although the RCA can continue to operate with a reduced number of members; if desired, the original number of members can be restored by following the protocol for adding a new member. In addition, the amount of time in which the additional verification is needed can be reduced by initiating the protocol for changing the root public key.

Each RCA member, $RCA_i$, stores its private key fragment $F_i$ in the signing unit of that RCA member. The signing unit will generate an encryption key (FEK) and use a secret sharing scheme to distribute FEK to signing unit administrators and signing officers so that a quorum of kA administrators and kSO signing officers will be required to determine FEK. In some embodiments, FEK may be the same as the encryption key (CKEK) used to encrypt the communication keys of the RCA member. The size of the quorum of administrators used to reconstruct FEK may be different from the number used to reconstruct CKEK. Also, either kA or kSO may be zero. Also, kSO may be different from kO, the number of signing officers needed to approve a signature. The construction, distribution, and use of FEK will follow the description of the construction, distribution, and use of CKEK described earlier, but with some change so that both administrators and signing officers could be required.

The signing unit 70 and the signing unit administrators and the signing officers will set up a secret sharing scheme so that any kA administrators and kSO signing officers can direct the signing unit to compute Fragment Encryption Key, FEK. FEK will be the encryption key for a single key algorithm, for example, triple DES. The signing unit will select the key, FEK, randomly. The signing unit will contain a prime PRIME such that PRIME is larger than the $2^{128}$. The value $2^{128}$ is used because the FEK will have at most 128 bits. If a different key size is chosen for FEK, the size of PRIME can be modified appropriately. The signing unit will randomly select a polynomial $wA_{FEK}$ of degree kA-1, and a polynomial $wSO_{FEK}$ of degree kB-1 such that $wA_{FEK}(0)+wSO_{FEK}$=FEK mod PRIME, where FEK is interpreted as the binary representation of an integer. Specifically, the signing unit will randomly select integers $A_0 A_1, \ldots, A_{kA-1}$, $C_1, \ldots, C_{kSO-1}$ and will set $wA_{FEK}(x)=A_0+A_1 x+A_2 x^2 + \ldots +A_{kA-1}x^{kA-1}$ mod PRIME and $wSO_{FEK}(x)=FEK-A_0+C_1 x+C_2 x^2 + \ldots +C_{kSO-1}x^{kSO-1}$ mod PRIME. For each SUA, the signing unit will send the value of $wA_{FEK}(i)$ mod PRIME to the token of $SUA_i$ encrypted with $E_{SUAi}$. The token of $SUA_i$ will decrypt this message, recover the value of $wA_{FEK}(i)$ and store it in the token. Similarly, for each SO, the signing unit will send the value of $wSO_{FEK}(i)$ mod PRIME to the token of $SO_i$ encrypted with $E_{SOi}$. The token of $SO_i$ will decrypt this message, recover the value of $wSO_{FEK}(i)$ and store it in the token. The values of $wA_{FEK}(i)$ and $wSO_{FEK}(i)$ would probably be stored in encrypted form in the tokens following standard procedures of the token. Following a testing phase, FEK will be used to encrypt the private value, $F_i$, to form $FEK(F_i)$ which will then be stored on the disk of the signing unit of RCA member, $RCA_i$. The plaintext copy of FEK will then be erased from memory.

Whenever the signing unit needs to recover the key $F_i$ from the disk, a quorum of kA signing unit administrators and kSO signing officers will issue a command to reconstruct the key $F_i$. The signing unit will generate a temporary encryption/decryption key pair, $ET_{SU}/DT_{SU}$.

For each of the kA signing unit administrators, $SUA_i$, the signing unit will send $ET_{SU}$ to $SUA_i$. $SUA_i$ will encrypt $wA_{FEK}(i)$ with $ET_{SU}$ and send it back to the SU. For each of the kSO signing officers, $SO_i$, the signing unit will send $ET_{SU}$ to $SO_i$. $SO_i$ will encrypt $wSO_{FEK}(i)$ with $ET_{SU}$ and send it back to the SU. When the SU has received and decrypted the kA values $wA_{FEK}(i)$ and the kSO values $wSO_{FEK}(i)$, then the SU can compute FEK by calculating the following sum. To denote the kA administrators participating in this procedure, first denote a set B={$B_1, B_2, \ldots, B_{kA}$} of integers. Then $SUA_{Bi}$ will represent the ith SUA administrator participating in this procedure. To denote the kSO signing officers participating in this procedure, denote a set D={$D_1, D_2, \ldots, D_{kSO}$} of integers. Then $SO_{Di}$ will represent the i'th So participating in this procedure. Then $$wA_{FEK}(o) = \sum_{B_i \text{ in } B} wA_{FEK}(B_i) \prod_{\substack{B_j \text{ in } B \\ j \neq i}} \frac{(-B_i)}{(B_j - B_i)} \mod q$$

and $$wSO_{FEK}(o) = \sum_{D_i \text{ in } D} wSO_{FEK}(D_i) \prod_{\substack{D_j \text{ in } D \\ j \neq i}} \frac{(-D_i)}{(D_j - D_i)} \mod q$$

then FEK=$wA_{FEK}(0)+WSO_{FEK}(0)$.

The signing unit uses FEK to decrypt $FEK(F_i)$ to obtain $F_i$. The signing unit then erases the values of FEK, DTSU, and all temporary values used in the computation of FEK from memory. For additional security, it might be a policy that some number of the signing unit administrators would be required to input their encrypted wA(i) directly to the signing unit or over a physically secure network.

Backups

The encrypted fragment $FEK(F_i)$ may also need to be stored outside of the signing unit so that it can be recovered in the event of a complete failure of the signing unit. This is particularity important in the case of an n-of-n system and somewhat important in the case of an (n−1)-of-n system. In any k-of-n system, it is also necessary to store the encrypted communication keys, $CKEK(D_{RCAi})$ and $CKEK(V_{RCAi})$ outside of the signing unit.

In the preferred embodiment, any of these keys that need to be stored outside of the signing unit will be stored using the following procedure. Trusted devices will be used for the storage. The encrypted keys could be stored as identical copies, or they could be split into shares so that any kK of the shares could be used to reconstruct the encrypted keys. The method for splitting these encrypted keys into shares of a secret sharing scheme would follow the description of splitting the key CKEK into shares. At least one copy of the encrypted keys (or kK shares in the case of split storage) will kept local to the signing unit, so in the case of a failure of the signing unit, the key fragment can be quickly recovered. In addition, at least one copy (or kK shares in the case of split storage) will be kept at a remote facility for backup in the event of catastrophe at the RCA member site. Also to protect against a catastrophe, there should always be at least kA administrators and kO (or kSO if kSO>kO) signing officers that are not present in any physical location.

Time Stamping The Membership Of The RCA

As it is one of the purposes of the present invention to facilitate changes in the RCA membership structure, it is desirable to have a mechanism for determining the exact makeup of the RCA that participated in signing a particular certificate. In a preferred embodiment, when the RCA is formed, and whenever it changes, a document will be prepared that contains the updated membership of the RCA and the current time. The document will also indicate an ordering to the RCA membership. This document will then be signed by the RCA and archived. All RCA members will keep a copy of the document. Each signing unit will use this list and the ordering to determine which RCA members are participating in a particular signature. In another preferred embodiment, the time stamp could be provided by the method described in U.S. Pat. No. 5,136,647.

Testing Procedure

In some of the following protocols, the private root key fragments of RCA members will be modified. In some of these protocols, it will be necessary to delete the old key fragments to maintain security for future use. In the preferred embodiment, it is recommended that new key fragments be used in a testing period (1 to 10 days depending on the signing volume) before the old key fragments are deleted. During this testing period, it is important that the messages that are being signed only for testing purposes do not reflect anything of value. Therefore, it will be necessary for the RCA members to examine the messages that are being signed only for the testing process to make sure they do not have any value. Because the messages are hashed during the signature process, the testing could occur on messages that have specific formats that are not consistent of the formats for meaningful messages.

Fragment Resplitting Protocol

If the root verification key is changed to a new key, then all certificates that had been certified by the root signature key must be re-certified. Therefore, it is highly desirable to keep the same root verification key for an extended period of time. However, it is considered good practice in cryptographic systems to change keys on a routine basis. There are cryptographic techniques, sometimes called pro-active, for changing the signature group fragments without changing the group verification key. A cryptographic protocol that can has been proposed by A. Herzberg, et. al. These techniques would, in theory, protect against the following attack on an k-of-n group multi-step system.

Suppose an adversary was able to find k−1 of the fragments during some time period. Suppose further that the adversary was able to be expelled from the k−1 systems that had been compromised, and that the adversary did not know the decryption keys that the group members used to decrypt messages from other group members. After applying the cryptographic protocol for changing the group signature fragment, the previous information that the adversary held would no longer be of any use.

One problem with the foregoing pro-active cryptographic techniques is that they assume that the adversary does not know the communication decryption keys. In a real system applying these techniques, there would be multiple barriers that an adversary would have had to break through in order to get access to the key fragments, so gaining access to these decryption keys might not be much harder than gaining access to the private fragments. Descriptions of the pro-active techniques have not included practical plans for storing or protecting these decryption keys. Also, previous presentations of these cryptographic techniques did not discuss the need for and the role of the administrators of the system.

In a k-of-n system, if an adversary is able to obtain access to a fragment of a member, it would be desirable to make the adversary's knowledge of the fragment useless while maintaining the integrity of the root key. Furthermore, if an adversary obtains knowledge of k−1 of the fragments, it would also be desirable to make that knowledge useless while maintaining the integrity of the root key. Assuming that the adversary does not have access to the decryption keys of any of the RCA members a method is provided in the system of the present invention wherein the fragments that group members hold can be changed while maintaining the same root verification key. In this method, some subset of k RCA members will perform Procedure 2 with k'=k and n'=n.

If, however, the adversary has obtained the private decryption key that an RCA member used in the protocol, then by capturing the communications during the fragment resplitting protocol, the adversary would know the new fragment of that RCA member. To add security in this system, the communication keys are changed periodically or just prior to the fragment resplitting following the procotol given earlier for changing the communication keys. Further, a separate set of communication keys could be provided that are only used during a fragment resplitting and then changed before another fragment resplitting.

If the adversary has, in addition, obtained access to the private signature key held by the RCA member, then the adversary could impersonate the RCA member during the exchange process. This would likely be detected during the testing period of the communication key change described earlier. If such a compromise is detected, a private meeting would be arranged for a new key exchange.

Lastly, if an adversary has modified the software on the signing unit of an RCA member, the foregoing mechanisms will not be sufficient. To protect against this attack, a fresh copy of the software will be obtained and loaded onto the trusted device using the start up procedure described earlier. In the k-of-n system for k<n, the RCA member will receive a new fragment of the root private signature key from some subset of k other RCA members following the protocol to add a member. In the n-of-n system, the RCA member will reconstruct the fragment from backup copies as described earlier.

Modifying k Protocol Or Modifying k And n

The system and method of the present invention provide a mechanism for changing the value of k. Increasing the value of k would decrease the risk of a compromise. Decreasing the value of k would decrease the cost of computing a multi-step signature. Over an extended period of time, conditions could change that would make such modifications the membership of the RCA desirable. As the value of the certificates that are issued by the RCA increases, it might be desirable to increase k so that more signers are required on each certificate. Because preferred values for k might be n−2 or n−1, it might be necessary to increase n at the same time.

If n is going to be increased, the first step will be to exchange public encryption and verification keys between the new members who are going to be added and the old members. This could be accomplished through a physical exchange of keys as described in the set up procedure, or it could be handled through certification of the public keys of the old and new members.

If the value of k and n both need to be increased by one, this can be accomplished by applying Procedure 2, with the values of k'=k+1, and n'=n+1.

After computing the new fragments and undergoing the testing period with the new fragments, the old fragments, $F_i$, are destroyed. Because it would still be possible to sign a message with k old $F_i$, not destroying the old $F_i$'s would defeat the perceived additional security in moving to a k+1 of n+1 system.

If the signing units do not have the capability of doing backups, then each signing unit, $RCA_i$, can simply issue a message signed by $SRCA_i$, stating that it has destroyed the old $F_i$. If backups of $FEK(F_i)$ have been made, then even if the signing unit had destroyed the copy of the old $FEK(F_i)$, there is no guarantee that all the copies have also been destroyed. Therefore, in the system of the present invention, each signing unit keeps track of the trusted devices that have stored a backup copy of $FEK(F_i)$ (or a backup copy of a fragment of the $FEK(F_i)$). When the signing unit receives a request to destroy backup copies, it communicates with all of the trusted devices to ensure that the copies (and any copies of fragments of the $FEK(F_i)$) held by these other trusted devices have been destroyed. In addition to destroying the copies of $FEK(F_i)$, the signing unit administrators will also destroy all of the shares that were used in the computation of FEK. The signing unit can query each token of each of the administrators to be sure that the share of FEK was destroyed. The signing unit then erases its own copy and issues the signed message stating that all copies had been destroyed.

If there is a need to decrease k, then Procedure 2 can be applied with k'=k−1 and n'=n or n−1 as desired. If there is a need to decrease n by 1 while keeping k fixed, the preferred method is to use Procedure 2. It will be necessary for the RCA member who is being deleted to send the signed message that the old keys (and all copies) have been deleted.

Protocol For Adding an RCA Member to an n-of-n system

In the case of an n-of-n system, there is an alternate embodiment for adding an RCA member. As in the k-of-n system, the first step will be to exchange public encryption and verification keys between the new members who are going to be added and the old members. This could be accomplished through a physical exchange of keys as described in the set up procedure, or it could be handled through certification of the public keys of the old and new members.

A group of m existing members would then split their m key shares into m+1 key shares. Although m can be less than n, it is preferred that m=n=the number of existing RCA members.

These m members will perform Procedure 2 with k'=m and n'm+1. These m members and the new member will receive new values of $x_i$, called $NEWx_i$ as a result of Procedure 2. Each existing RCA member in the protocol and the new RCA member computes new public values for $FV_i$ as: $NEWFV_i = g^{NEWxi} \mod p$. Each of the RCA members in the protocol and the new RCA member then stores the $NEW_{xi}$ and $NEWFV_i$. Each existing RCA member destroys the old $x_i$ after going through the testing procedure as described earlier. The $x_i$ are then replaced by the $NEWx_i$. The $x_i$ then satisfy that the sum of all of the $x_i$ is SRCA. The membership of the RCA is then updated.

Replacing Signing Officers and Administrators

One purpose for the fragment resplitting is to protect against an attack in which an adversary tries to obtain k of the fragments of the root signature key, and thus to forge signatures. An adversary must obtain k fragments between the times of the resplitting protocol. Another method that an adversary might use to obtain a fraudulent signature is to corrupt enough RCA member signing officers or administrators. Modifying the key fragments does not help prevent this attack. The protocol presented in this section helps protect against such an attack by replacing signing officers and administrators on a routine basis.

First, we will describe how to add a single RCA signing unit administrator. A quorum of kA of the RCA signing unit administrators will be required to authorize the transaction. To denote the kA administrators participating in this procedure, first denote a set $B=\{B_1, B_2, \ldots, B_{kA}\}$ of integers. Then $SUA_{Bi}$ will represent the ith SUA administrator participating in this procedure. These kA administrators and the signing unit will follow the protocol for reconstructing their secret values of the polynomials $W_{CKEK}$ and $wA_{FEK}$, in the memory of the signing unit. The new signing unit administrator will be assigned a new index number, ix, and will initialize a token following the process described earlier. The signing unit will compute $W_{CKEK}(ix)$ using the formula $$w_{CKEK}(ix) = \sum_{B_i \text{ in } B} w_{CKEK}(B_i) \prod_{\substack{B_j \text{ in } B \\ j \neq i}} \frac{(ix - B_i)}{(B_j - B_i)} \mod q$$

and will compute $wA_{FEK}(ix)$ using the formula $$wA_{FEK}(ix) = \sum_{B_i \text{ in } B} wA_{FEK}(B_i) \prod_{\substack{B_j \text{ in } B \\ j \neq i}} \frac{(ix - B_i)}{(B_j - B_i)} \mod q$$

The signing unit will encrypt $w_{CKEK}(ix)$ and $wA_{FEK}(ix)$ using $E_{SUAix}$ and send it to the new signing unit administrator, $SUA_{ix}$.

To delete a signing unit administrator also requires a quorum of kA of the current administrators to authorize the transaction, but it requires all of the current administrators other than the administrator being deleted to complete the transaction. After the signing unit has received authorization to delete signing unit administrator $SUA_{iDEL}$, the signing unit will delete that SUA from its list of approved administrators. Then CKEK will be constructed, the keys $V_{RCAi}$ and $D_{RCAi}$ will be decrypted and placed in memory. Then a new CKEK will be chosen, the keys $V_{RCAi}$ and $D_{RCAi}$ will be re-encrypted, stored, and erased from memory, a new polynomial $W_{CKEK}$ will be selected using the method described earlier for selecting $W_{CKEK}$, the values of the new $w_{CKEK}$ will be distributed to the existing SUA's, and the values of the old $W_{CKEK}$ will be erased from memory. In addition all backup copies of the encryption of $V_{RCAi}$ and $D_{RCAi}$ by CKEK will be destroyed and replaced by the encryptions of $V_{RCAi}$ and $D_{RCAi}$ by the new CKEK. In a similar manner, kA signing unit administrators and kSO signing officers will communicate with the signing unit to compute FEK. Then a new FEK will be chosen, the key $F_i$ will be re-encrypted and stored, new polynomials $wA_{FEK}$ and $wSO_{FEK}$ will be selected using the method described earlier for selecting $wA_{FEK}$ and $wSO_{FEK}$, the values of the new $WA_{FEK}$ will be distributed to the existing SUA's, and the values of the $wSO_{FEK}$ will be distributed to the existing SO's, and the values of the old $wA_{FEK}$ and $wSO_{FEK}$ will be erased from memory. In addition all backup copies of the encryption of $F_i$ by FEK will be destroyed and replaced by the encryption of $F_i$ by the new FEK.

The procedure for adding and deleting signing officers will be similar, except that a quorum of signing unit administrators and a quorum of signing officers will be required to add a signing officer. Also, the key FEK will take the place of CKEK. For clarity, the procedure is repeated with the appropriate changes.

A quorum of kA of the RCA signing unit administrators and kSO of the signing officers will be required to authorize the addition of a signing officer. To denote the kA administrators participating in this procedure, first denote a set $B=\{B_1, B_2, \ldots, B_{kA}\}$ of integers. Then $SUA_{Bi}$ will represent the ith SUA administrator participating in this procedure. To denote the kSO administrators participating in this procedure, denote a set $D=\{D_1, D_2, \ldots, D_{kSO}\}$ of integers. Then $SUA_{Di}$ will represent the ith SUA administrator participating in this procedure. These kA administrators, kSO signing officers, and the signing unit will follow the protocol for reconstructing their secret values of the polynomial $WSO_{FEK}$, in the memory of the signing unit. The new signing officer will be assigned a new index number, ix, and will initialize a token following the process described earlier. The signing unit will compute $wSO_{FEK}(ix)$ using the formula $$wSO_{FEK}(ix) = \sum_{B_i \text{ in } B} wSO_{FEK}(B_i) \prod_{\substack{B_j \text{ in } B \\ j \neq i}} \frac{(ix - B_i)}{(B_j - B_i)} \mod q$$

The signing unit will encrypt $wSO_{FEK}(ix)$ using $E_{soix}$ and send it to the new signing officer, $So_{ix}$.

To delete a signing officer also requires a quorum of kA of the signing unit administrators and kSO of the current signing officers to authorize the transaction, but it requires all of the current administrators and all of the signing officers other than the signing officer being deleted to complete the transaction. After the signing unit has received authorization to delete signing officer $SO_{iDEL}$, the signing unit will delete that SUA from its list of approved administrators. Then a new FEK will be chosen, the key $F_i$ will be re-encrypted and stored, new polynomials $wA_{FEK}$ and $wSO_{FEK}$ will be selected using the method described earlier for selecting $wA_{FEK}$ and $wSO_{FEK}$, the values of the new $wA_{FEK}$ will be distributed to the existing SUA's, and the values of the $WSO_{FEK}$ will be distributed to the existing SO's, and the values of the old $wA_{FEK}$ and $wSO_{FEK}$ will be erased from memory.

In addition all backup copies of the encryption of $F_i$ by FEK will be destroyed and replaced by the encryption of $F_i$ by the new FEK.

Modifyinq The Root Public Key

Through the application of the foregoing systems and methods, it is possible to maintain the root verification key notwithstanding desired, or required, system changes. It is desirable, however, that the root verification key be capable of change nonetheless. One reason is that advances in computational number theory can result in the root verification key being subject to a computational attack.

The preferred process for changing the root verification key is a multiple stage process, possibly extending over several years. The RCA members that participate as fragment signers for the new root verification key can be the same as the members of the old RCA members, there can be some overlap with the old RCA, or there can be entirely new RCA members. To begin the process, a new root verification key is constructed, using the procedure outlined above. The old RCA then issues a certificate for the new root verification key, and the new RCA issues a certificate for the old root verification key. Some user devices that contain the old root verification key will have the capability to accept a command signed by the old root signature key to replace the old root verification key with the new root verification key.

There may, however, be devices that will not be able to execute such a command or will not be able to process certificates with the new key sizes. A period of time will be provided, therefore, in which users will have the choice of having their certificate issued by the old RCA root signature key, the new RCA root signature key or both. Also for some period of time, users will have the option of having their old certificates reissued, time stamped, and signed by the new key. Then, after some period of time has passed, the old root verification key will be revoked. Anyone having a document time stamped with a signature certified through the old root verification key will have to have a new time stamp placed on the document certified through the new root verification key, further stating that the new time stamp was placed while the old root verification key and thus the old time stamp was still valid.

Protocol For Recovering From Lost Fragment in an n-of-n multi-step system

It should be readily understood that in the n-of-n multi-step key fragment system described above, a valid signature may only be formed from a combination of all n key fragments. While any combination of less than n key fragments will form a unique signature, only that signature formed from all of the key fragments will correspond to the RCA private key and thus be verifiable by the RCA public key. Service could be interrupted if a key fragment is lost because valid signatures cannot be formed.

In order to ameliorate the impact of such a loss, the n-of-n system can be organized so that easily verifiable signatures can be formed not only from a combination of all n key fragments but also from a combination of any n−1 key fragments. As set forth above, the RCA members compute and certify a root public key VRCA. The RCA members also compute and certify a set of public keys $z_1, z_2, \ldots, z_n$; where the $z_j$ is the product of all $FV_i$ except $FV_j$. If RCA member RCA$_j$ loses his fragment, he ceases operation. The remaining RCA members can continue to sign (using n−1 fragments), and the signatures can be verified by using Z$_j$. In particular, the z$_j$ formed from the product of all the FV$_i$ except for FV$_j$, the lost fragment. Any certificate signed by the remaining subset of n−1 members can be verified by z$_j$, and because z$_j$ has a certificate from the root public key V$_{RCA}$, Z$_j$ can be verified by V$_{RCA}$. Although the RCA can continue to operate with a reduced number of members the original number of members can be restored, if desired, by following the protocol for adding a new member. In addition, the amount of time in which the additional verification is needed can be reduced by initiating the protocol for changing the root public key.

Decreasing Chain Length

It is usually assumed that there is a hierarchy of CA's, where the root (or tier one) CA certifies tier two CA's, and then tier two CA's certify tier three CA's and so forth. A problem with that arises in such systems, however, is that if a user has a certificate from, for instance, a tier four CA, then a verifier would need to check five signatures in order to verify a signature on a document. One method that has been proposed to avoid this problem is to have, for example, the tier four CA check the identity of the user to sign the certificate and send it to the tier three CA who then signs the certificate and so forth until it is signed by the root CA. In this way, a certificate issued by a tier four CA can still be verified with just a single verification. One method for achieving a decreasing of the verification chain length is described in U.S. Pat. No. 5,420,927.

An alternative method for decreasing the verification chain length is to allow users (or CA's) who hold certificates from certifying authorities at one tier of the hierarchy, to submit messages with that signature certificate attached directly to the next higher certifying authority. The higher certifier would check the authenticity of the certificate, and then sign a special certificate that in effect stated that the certificate of the lower tier CA had been issued by the stated lower tier CA and that the certificate was valid. A verifier who was verifying the signature of the user would need only check the signature of the special certificate and would not need to check the signature of the lower tier CA.

In accordance with this method, a fee may be imposed for certification, and the fee generally would increase for certification at higher tiers of the hierarchy. These signatures could be preformed automatically by the RCA members with no need for approval on an individual basis by the signing officers.

It is to be noted that, while explained with reference to the system configuration of FIG. 1, an infinite number of system configurations can be achieved using the foregoing teachings. Some of the system configuration parameters which can be selected are; (1) the number tiers in the certifying authority hierarchy, (2) selecting any or all of the certifying authorities to be organized as a key fragment group, and (3) selecting any or all of the certifying authorities or key fragment members to have their key or fragment divided into shares. The methods for implementing these and other system configuration parameters will be readily understood from the foregoing description of the present invention.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A multi-step digital signature system, comprising:

a distributed certifying authority;

said distributed certifying authority including a plurality of certifying authority members, wherein approval of a plurality of said plurality of certifying authority members is required to generate a digital signature for the distributed certifying, authority, wherein at least one of said plurality of certifying authority members includes an input device for receiving instructions from a plurality of signing officers.

2. The multi-step digital signature system of claim 1, wherein said instructions from said plurality of signing officers permit said certifying authority member to generate a digital signature.

3. The multi-step digital signature system of claim 2, wherein approval from a quorum of the plurality of signing officers is required before the certifying authority member is approved to generate a digital signature.

4. The multi-step digital signature system of claim 1, wherein said instructions from said plurality of signing officers direct a change in the signing protocol for the certifying authority member.

5. The multi-step digital signature system of claim 4, wherein approval from a quorum of the plurality of signing officers is required before the certifying authority member is approved to generate a digital signature.

6. A multi-step digital signature system, comprising a distributed certifying authority, said distributed certifying authority including a plurality of certifying authority members, wherein approval of a plurality of said plurality of certifying authority members is required to generate a digital signature for the distributed certifying, authority, wherein said distributed certifying authority is one of a plurality of certifying authorities communicating to form a plurality of hierarchical certifying tiers, wherein at least one of said plurality of certifying authority members of said distributed certifying authority includes an input device for receiving instructions from a plurality of signing officers.

7. The multi-step digital signature system of claim 6, wherein said instructions from said plurality of signing officers permit said certifying authority member to generate a digital signature.

8. The multi-step digital signature system of claim 7, wherein approval from a quorum of the plurality of signing officers is required before the certifying authority member is approved to generate a digital signature.

9. The multi-step digital signature system of claim 6, wherein said instructions from said plurality of signing officers direct a change in the signing protocol for the certifying authority member.

10. The multi-step digital signature system of claim 9, wherein the signing protocol for the certifying authority member may be changed to increase the number of signing officers.

11. The multi-step digital signature system of claim 9, wherein the signing protocol for the certifying authority member may be changed to decrease the number of signing officers.

12. The multi-step digital signature system of claim 9, wherein approval from a quorum of the plurality of signing officers is required before the certifying authority member is approved to generate a digital signature.

13. A method for decreasing the verification chain length in a hierarchical digital signature system, comprising the steps of:

obtaining a signature certificate for a user from a certifying authority at a first tier of said hierarchical digital signature system;

presenting said signature certificate from said first tier certifying authority to a higher tier certifying authority;

receiving, from said higher tier certifying authority, a certificate authenticating the signature of the first tier certifying authority; and presenting said authenticating certificate of said higher tier certifying authority from a user to a verifier.

14. A method of generating a digital signature in a n-of-n multi-step digital signature system having n certifying authority members in a distributed certifying authority, comprising the steps of:

receiving, at said distributed certifying authority, a message (m) to be signed;

distributing said message to each of said n certifying authority members;

preparing separate messages (HASHr), at each of said certifying authority members, in accordance with a method including the following steps;

selecting a random number (k);

calculating a value (r) from said random number (k) using the function $$r = g^{kD(m, HASH)} \mod p;$$

calculating the HASH of said r value to obtain HASHr;

distributing said HASHr values such that the HASHr value prepared by each certifying authority member is received by each of the other n−1 certifying authority members;

distributing said r values such that the HASHr value prepared by each certifying authority member is received by each of the other n−1 certifying authority members;

confirming, at each of the certifying authority members, the r values for each of the other n−1 certifying authority members using the function SHA(r)=HASHr;

computing, at each of the certifying authority members, a composite r value as the product of all of the r values;

computing, at each of the certifying authority members, a signature fragment value using the composite r value.

15. A method of generating a digital signature in a n-of-n multi-step digital signature system having n certifying authority members in a distributed certifying authority, comprising the steps of:

receiving, at said distributed certifying authority, a message (m) to be signed;

distributing said message to each of said n certifying authority members;

computing a separate value (r), at each of said certifying authority members, in accordance with a method including the following steps;

selecting a random number (k);

calculating a value (r) from said random number (k) using the function $$r = g^{kD(m, HASH)} \mod p;$$

providing evidence that the discrete log of r mod p is known;

distributing said evidence such that the evidence of each certifying authority member is received by each of the other n−1 certifying authority members;

distributing said r values such that the r value computed by each certifying authority member is received by each of the other n−1 certifying authority members;

verifying, at each of the certifying authority members, the evidence to confirm the knowledge of the discrete log of the r values of each of the other n−1 certifying authority members;

computing, at each of the certifying authority members, a composite r value as the product of all of the r values;

computing, at each of the certifying authority members, a signature fragment value using the composite r value.

16. In a k-of-n multi-step digital signature system, a method of identifying the k members that participated in generating a signature, comprising the steps of:

appending a set of n bits to the end of the message to be signed wherein each of said n bits is associated with one of said n members of the k-of-n multi-step digital signature system;

indicating with said n bits which k members participated in generating said signature.

17. The method of claim 16, wherein said indicating step includes indicating with a logic high the k members who participated in generating said signature and indicating with a logic low said members who did not participate.

* * * * *